United States Patent
Neet

(10) Patent No.: US 12,294,266 B2
(45) Date of Patent: May 6, 2025

(54) STATOR WINDING WITH OVER-UNDER END TURNS FOR CROSSOVER ALIGNMENT

(71) Applicant: BorgWarner Inc., Auburn Hills, MI (US)

(72) Inventor: Kirk Neet, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 167 days.

(21) Appl. No.: 18/325,535

(22) Filed: May 30, 2023

(65) Prior Publication Data

US 2023/0396115 A1    Dec. 7, 2023

Related U.S. Application Data

(63) Continuation-in-part of application No. 17/833,368, filed on Jun. 6, 2022, now Pat. No. 12,132,369.

(60) Provisional application No. 63/415,820, filed on Oct. 13, 2022.

(51) Int. Cl.
   *H02K 3/28*    (2006.01)

(52) U.S. Cl.
   CPC ................................. *H02K 3/28* (2013.01)

(58) Field of Classification Search
   CPC .. H02K 3/28; H02K 1/16; H02K 3/12; H02K 2213/03
   See application file for complete search history.

(56) References Cited

U.S. PATENT DOCUMENTS

| | | | |
|---|---|---|---|
| 7,005,772 B1 * | 2/2006 | Frederick | H02K 3/12 310/179 |
| 7,034,428 B2 | 4/2006 | Cai et al. | |
| 2018/0034335 A1 | 2/2018 | Neet et al. | |
| 2020/0244126 A1 * | 7/2020 | Neet | H02K 3/28 |

* cited by examiner

*Primary Examiner* — Mohamad A Musleh
(74) *Attorney, Agent, or Firm* — Maginot, Moore & Beck, LLP

(57) ABSTRACT

An electric machine includes a stator core and a winding. The stator core includes a plurality of radially extending teeth defining a number of slots in the stator core. The winding is positioned on the stator core and includes a plurality of conductors connected together to provide a plurality of parallel paths per phase for the winding. The winding defines a number of conductor layers in each slot, a number of poles, and a number of slots-per-pole-per-phase. The winding includes a plurality of standard-pitch end loops and a plurality of sets of over-under end loops. A plurality of crossover end loops for each of the plurality of parallel paths per phase are substantially aligned in a radial direction on the stator core.

20 Claims, 8 Drawing Sheets

Standard 6 pitch end loops        7 pitch over a 5 pitch end loops

STATOR WINDING WITH OVER-UNDER END TURNS FOR CROSSOVER ALIGNMENT

CROSS-REFERENCE TO RELATED APPLICATIONS

This application is a continuation-in-part of U.S. patent application Ser. No. 17/833,368, filed Jun. 6, 2022, and also claims the benefit of U.S. Provisional Patent Application No. 63/415,820, filed Oct. 13, 2022, the entire contents of which are incorporated by reference herein.

FIELD

The present disclosure relates to the field of electric machines, and more particularly, stator winding arrangements.

BACKGROUND

Stator windings are provided in various configurations with different features that provide different performance characteristics for the electric machine. Examples of different winding features include the number of poles, number of phases, number of slots-per-pol-per-phase, conductor type, number of conductor layers, number of parallel paths per phase, number of pole-turns, and types of connections between conductors, as well as any of numerous additional winding features.

Stator windings may be formed using different methods. For example, stator windings may be formed from wire strands that are continuously wound on the stator core or formed from a plurality segmented conductors that are connected together on the stator core. A segmented conductor includes two straight segments connected by an end loop. Accordingly, segmented conductors are sometimes referred to as "hairpin conductors" or "U-turn conductors." In order to form a winding with segmented conductors, the segmented conductors are inserted axially into the slots of a stator core, the ends of the conductors are twisted, and the terminal portions of the leg ends are then connected together to form paths for the winding.

Segmented conductors are particularly advantageous when special connections between conductors are required in order to complete the winding. Segmented conductors come in a number of different configurations, including differently sized conductors, and conductors with different pitches defined by the end turn loop (i.e., the distance between the straight segments of such conductors). Segmented conductors may be used to form any number of different winding arrangements based on the size and shape of the segmented conductors and the connections made between the segmented conductors.

In view of the ability to form different winding arrangements with different performance characteristics, it would be advantageous to provide an electric machine with a winding arrangement defined by multiple parallel paths, multiple wraps around pole sections, and each section of the path connected in series. Additionally, it would be advantageous if such winding arrangement included unique performance characteristics and could be manufactured and produced with relative simplicity without the need for significant cost increases over other segmented winding arrangements. These features and advantages for an electric machine, as well as others, will become more readily apparent to those of ordinary skill in the art by reference to the following detailed description and accompanying drawings. While it would be desirable to provide an electric machine with a segmented conductor winding arrangement that provides one or more of these or other advantageous features as may be apparent to those reviewing this disclosure, the teachings disclosed herein extend to those embodiments which fall within the scope of the appended claims, regardless of whether they include or accomplish one or more of the advantages or features mentioned herein.

SUMMARY

In at least one embodiment disclosed herein, a stator for an electric machine includes a stator core and a multi-phase winding positioned on the stator core. The stator core includes a plurality of teeth defining a number of slots in the stator core. The multi-phase winding includes a plurality of segmented conductors connected together to provide a plurality of parallel paths per phase for the winding, each conductor comprising (i) an end loop provided on a crown end of the stator core, (ii) two legs extending through the slots of the stator core, and (iii) two leg ends extending out of the slots on a connection end of the stator core, each leg end having a twist portion, wherein the leg ends of different conductors are connected together to form the multi-phase winding that wraps around the stator core. The winding defines a number of conductor layers in each slot, a number of poles, a plurality of parallel paths per phase, and a number of slots-per-pole-per-phase. The end loops on the crown end include a plurality of standard-pitch end loops and a plurality of sets of over-under end loops. A plurality of crossover end loops for at least one of the plurality of parallel paths per phase are substantially aligned in a radial direction on the connection end.

In at least one embodiment disclosed herein, an electric machine includes a stator core and a winding. The stator core includes a plurality of radially extending teeth defining a number of slots in the stator core. The winding is positioned on the stator core and includes a plurality of conductors connected together to provide a plurality of parallel paths per phase for the winding. The winding defines a number of conductor layers in each slot, a number of poles, and a number of slots-per-pole-per-phase. The winding includes a plurality of standard-pitch end loops and a plurality of sets of over-under end loops. A plurality of crossover end loops for each of the plurality of parallel paths per phase are substantially aligned in a radial direction on the stator core.

DESCRIPTION

A stator for an electric machine is disclosed herein. The stator includes a stator core with a winding formed thereon. The winding includes conductors arranged in layers in slots of the stator core. The conductors are arranged such that the winding includes a plurality of phases and a plurality of parallel paths per phase with the conductors form a plurality of coils on the stator core. In at least some embodiments, the winding is also configured such that the number of pole-turns for each parallel path of the winding is not evenly divisible by the number of poles of the winding.

General Configuration of Stator Core with Segmented Conductor Winding

Figure 1:
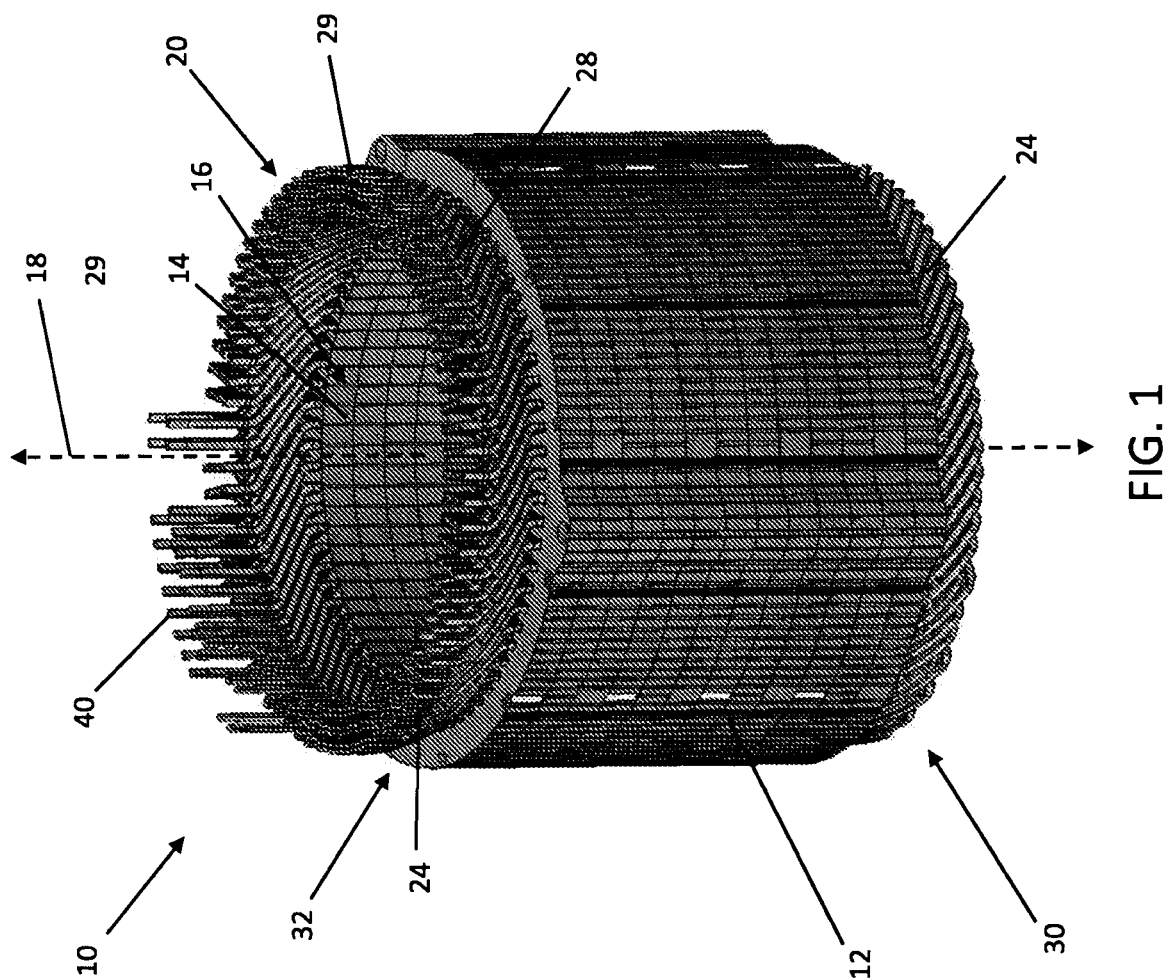
FIG. 1 is a perspective view of weld end of a stator core having a segmented conductor winding arrangement positioned thereon.

FIG. 1 shows a perspective view of the stator 10 for an electric machine, including a stator core 12 with a winding 20 formed on the stator core. The stator core 12 is comprised of a ferromagnetic material and is typically formed from a plurality of steel sheets that are stamped and stacked upon one another to form a lamination stack. The stator core 12 is generally cylindrical in shape as defined by a center axis 18, and includes an inner perimeter surface and an outer perimeter surface. The inner perimeter surface defines an inner diameter (ID) for the stator. The outer perimeter surface defines an outer diameter (OD) for the stator.

A plurality of teeth 14 are formed on the interior of the stator core 12 and directed toward the center axis 18. Each tooth 14 extends radially inward and terminates at the inner perimeter surface. Axial slots 16 are formed in the stator core 12 between the teeth 14. Each slot 16 is defined between two adjacent teeth, such that two adjacent teeth form two opposing radial walls for one slot. The teeth 14 and slots 16 all extend from a first end 30 (i.e., a "crown end") to a second end 32 (i.e., a "connection end" or "weld end") of the core.

Radial openings to the slots 16 are formed along the inner perimeter surface of the stator core 12. When the slots 16 are semi-closed, each radial opening to a slot 16 has a width that is smaller at the inner perimeter surface than at more radially outward positions (i.e., slot positions closer to the outer perimeter surface). In addition to the radial openings to the slots 16 through the inner perimeter surface, axial openings to the slots 16 are also provided the opposite ends 30, 32 of the stator core 12.

As shown in FIG. 1, the stator core 12 is configured to retain the winding arrangement 20 within the slots 16 of the stator core 12. The winding arrangement 20 is formed from a plurality of interconnected coils that are retained within the slots 16. The coils are comprised of interconnected conductor segments that extend through the slots and form paths that generally wrap around the core 12 with a plurality of coils formed upon the core. Each slot 16 is configured to retain some number of in-slot segments in "layers" of the slot, with the in-slot segments typically arranged in single-file manner such that each layer of the slot retains a single conductor segment.

Segmented Conductors for the Winding Arrangement

Figure 2:
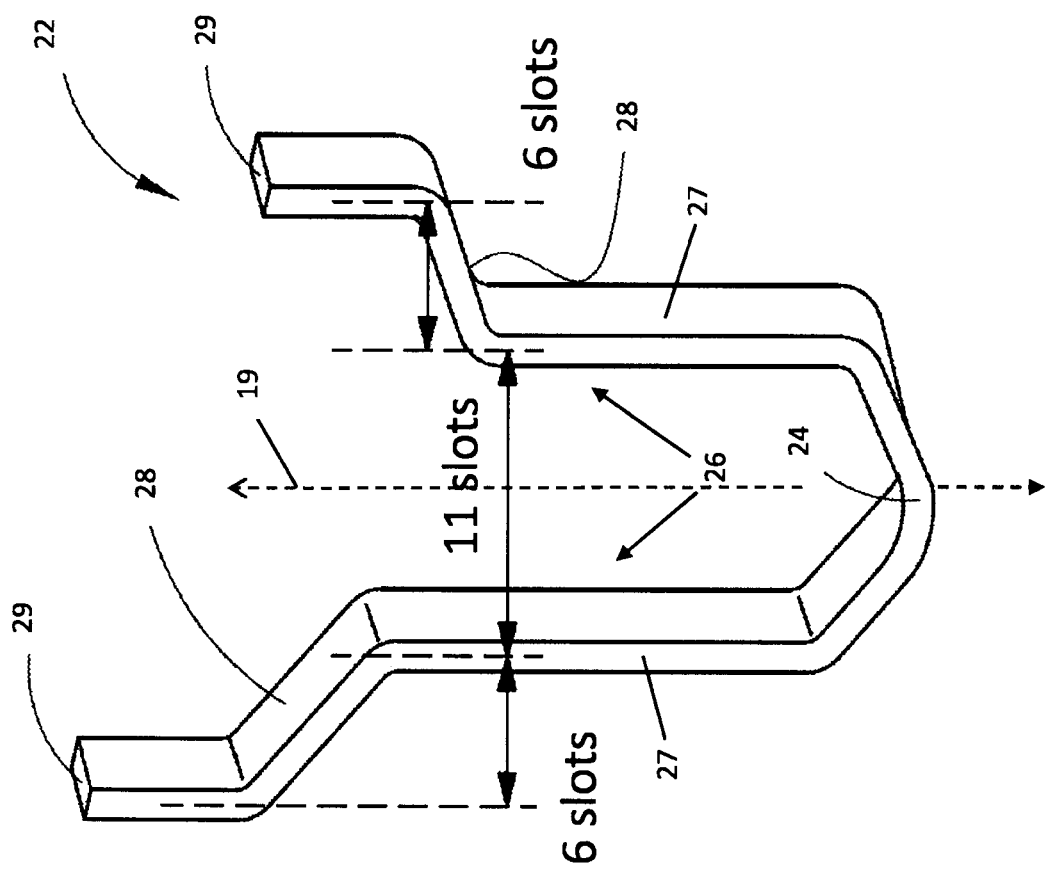
FIG. 2 is a perspective view of an exemplary segmented conductor used to form the winding arrangement of FIG. 1.

With reference now to FIG. 2, an exemplary segmented conductor 22 is shown in isolation from the winding arrangement 20. The segmented conductor 22 is formed of a length of conductive material such as copper. The exemplary segmented conductor shown in FIG. 2 also has a rectangular cross-sectional shape.

Each segmented conductor includes two legs 26 with an end loop 24 connecting the two legs 26. Each leg includes a straight portion 27, a twist portion 28, and a terminal portion 29. The straight portion 27 and the terminal portion 29 both extend in the axial direction. The straight portion 27 is configured to extend axially through one of the slots of the stator core and may also be referred to as an "in-slot portion." The twist portion 28 has axial, circumferential and radial direction components and extends between the straight portion 27 and the terminal portion 29.

The end loop 24 (which may also be referred to as the "end-turn" or "U-turn") of each segmented conductor 22 is arranged on the crown end 30 of the core and defines a 180° change in direction for the segmented conductor, and extends a circumferential distance associated with a number of slots of the stator core. This distance is referred to as the "pitch" (P) of the end loop. An end loop pitch P is defined as the end loop connecting a straight segment in a particular slot number (S) one with a straight segment in slot P+S. For example, an 11 pitch end loop (i.e., P=11) is defined as connecting a straight segment in slot one of the core (i.e., S=1) with a straight segment in slot twelve of the core (i.e., 11+1=12). In the exemplary conductor of FIG. 2, the end loop 24 is shown extending a distance equal to eleven slots of the core (i.e., P=11). Thus, as noted in the example above, if the straight portion 27 of the first leg is positioned in slot one of the core, the straight portion 27 of the second leg is positioned in slot twelve of the core.

Figure 3:
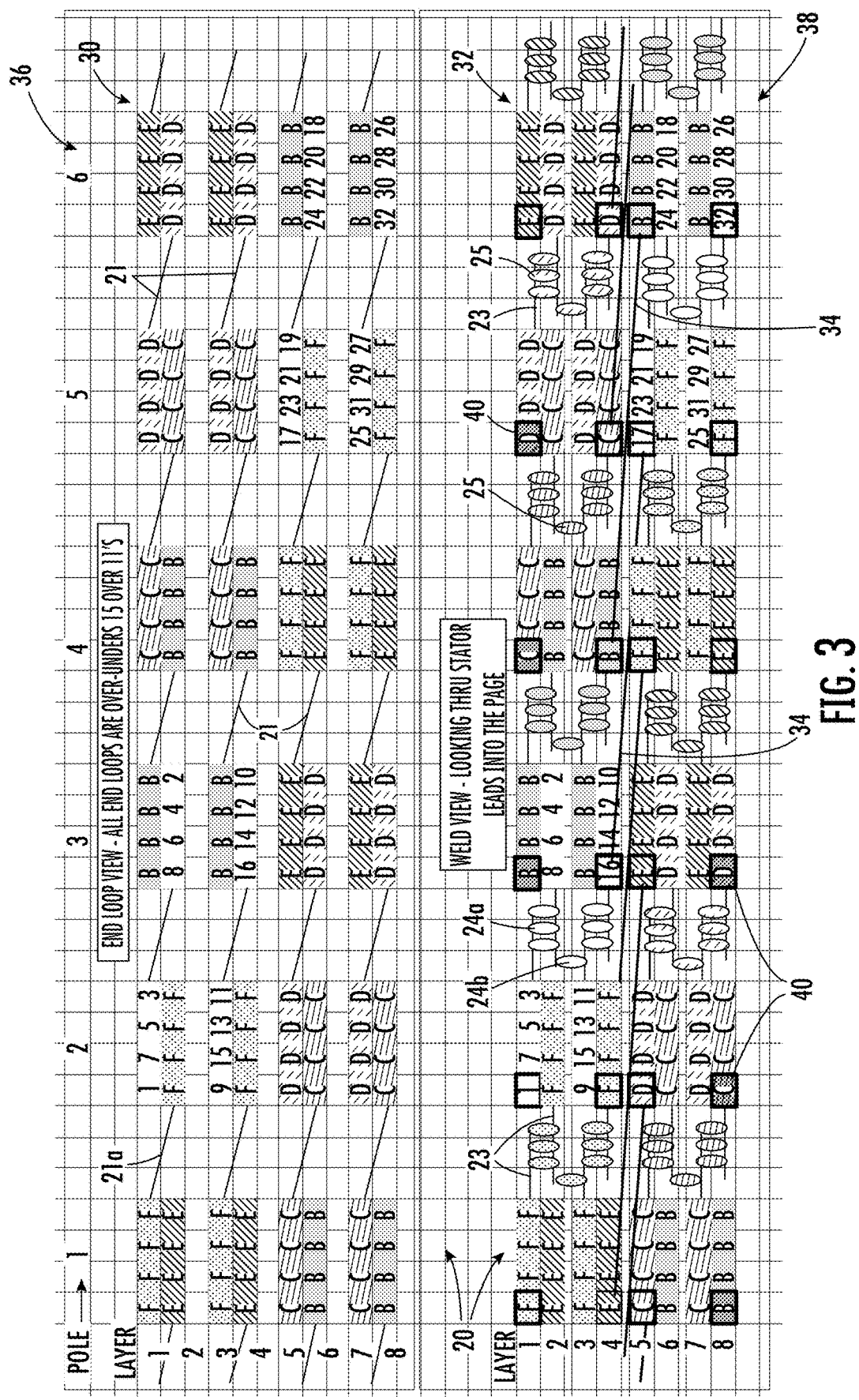
FIG. 3 is a tabular diagram of a segmented conductor winding configured for use in association with the stator of FIG. 1, wherein the number of pole-turn of the winding is not evenly divisible by the number of poles of the winding.

When forming the winding 20, the legs 26 are all initially straight and do not include the twist portion 28. This allows the legs 26 to be inserted axially into the slots 16 of the core 12, with all of the end loops 24 arranged on the crown end 30 of the core, all of the straight portions 27, extending through the slots 16, and all of the terminal portions 29 arranged on the connection end 32 of the core. For each segmented conductor, one leg is positioned in one layer of a slot, and the other leg is positioned in an adjacent layer of another slot, wherein the two slots are separated by the pitch of the end loop 24 on the crown end 30 of the core 12. Following insertion into the slots, the ends of the legs 26 extend axially out of the connection end 32 of the stator core. The ends of the legs 26 of each segmented conductor 22 are then bent/twisted in opposite directions such that a twist portion 28 is formed in each leg, wherein the twist portion 28 of one leg extends in an opposite circumferential direction from the twist portion 28 of the other leg. This circumferential distance spanned by each twist portion 28 is associated with a number of slots of the stator core 12, and is referred to as the "twist" (T) of the leg 26. In the exemplary conductor of FIG. 2, each leg 26 has a twist of six slots. While the twists are illustrated in FIG. 2 as being in opposite directions away from the center axis 19 of the segmented conductor for the sake of easily showing the twists, it will be recognized that the twists associated with the winding described herein, and particularly the winding of FIG. 3, are actually in opposite directions back toward the center axis 19 of the segmented conductor.

After twisting the legs 26, the terminal portions 29 of different conductors are connected together (e.g., by welding or other connection method) on the connection end 32 of the stator core 12 in order to complete the winding 20. Together, the twists (T) of two segmented conductors connected at their respective terminal portions 29 form an end loop defined by a pitch (P) on the weld end 32 of the stator core. Therefore, it will be recognized that each end loop 24 at the crown end 30 has a pitch defined by the end loop of the associated segmented conductor 22, and each end loop at the weld end 32 has a pitch defined by the two twists (T) of two connected leg ends (i.e., the connected terminal portions 29 of two leg ends).

While FIG. 2 illustrates one exemplary embodiment of a segmented conductor for the winding arrangement 20, it will be recognized that differently shaped conductor segments are also contemplated. For example, the pitch of the end loops 24 and the twist of the leg ends may be different with different segmented conductors used in the winding arrangement 20. As another example, leads 40 to the winding and/or busbar connections may be provided in association with elongated terminal portions 29 that extend past other terminal portions on the weld end 32 of the stator core 12.

Winding Arrangement with Parallel Paths and Quad Sections

With reference now to FIG. 3, a tabular view of a stator winding arrangement 20 is shown, wherein the winding arrangement is formed from a plurality of segmented conductors 22, as described above. As noted in the top two rows of the table of FIG. 3, the winding arrangement 20 includes six poles (as noted by the six slot sets associated with each phase) and is configured for use in a stator core having seventy-two slots. As noted in the leftmost column of FIG. 3, the conductors of the winding (i.e., the straight portions 27 of the conductor legs) are arranged in single-file manner in eight layers (L) in each of the seventy-two slots. In the disclosed embodiment of the winding, layer 1 is an outer layer of each slot and layer 8 is an inner layer of each slot, but it will be recognized that the winding may also be configured in the opposite arrangement wherein layer 1 is the inner layer and layer 8 is the outer layer of the slot.

Only one phase of the winding is illustrated in FIG. 3, and it will be recognized that, for a three phase winding, the two other phases are identical to that shown, but the first additional phase is shifted over four slots, and the second additional phase is shifted over eight slots. Thus, while the tabular view of FIG. 3 only shows three columns/slots between the slot sets of the illustrated phase for the sake of brevity, it will be recognized that eight slots are actually provided between each slot set.

As shown in FIG. 3 each path of the winding includes six parallel paths (i.e., path A, which is illustrated by numerals 1-32 in the slots, and similarly configured paths B, C, D, E and F, as noted in the table). Straight conductor portions for each of paths A-F are arranged in the slots, as shown in FIG. 3. For path A, the path begins in the slot identified by the numeral "1," jumps (via an end turn on the crown end 30) to the next slot identified by the numeral "2," jumps (via an end turn on the connection end 32) to the next slot identified by the numeral "3," and so on until the path ends at the slot identified by the numeral "32." Each of paths B, C, D, E and F also having thirty-two similarly configured conductors arranged in the slots. Leads 40 for each path are illustrated by the boxes with bold/darkened outlines. Thus, in the winding of FIG. 3, leads for path A extend from the connection end of the core at the slots where the conductors identified as numerals "1" and "32" are located.

The table of FIG. 3 includes an upper section 36 and a lower section 38 for the purpose of easily illustrating the end loops for the winding. In both the upper section 36 and lower section 38 of the table, the lines extending between the slot sets indicate the general arrangement of the end loops extending between slot sets. The upper section 36 of the table illustrates the end loops 24 on the crown end 30 of the stator core, each of which extends between the two conductors in two different slots of the winding (i.e., each end loop provided by the pre-formed end loop 24 of one of the segmented conductors 22). The lower section 38 of the table illustrates the end loops formed on the connection end 32 of the stator core which extend between conductors in various slots for one phase of the winding (i.e., end loops formed by the twisted leg ends and connections between the terminal portions 29). The lower section 38 is a view from the crown end 30, looking through the stator at the connection end 32. Again, each "end loop" (or "end turn") provides a connection between two conductor legs arranged in different slots. Examples of end loops include an end loop formed by the U-turn portion of a segmented conductors, an end loop formed by the welded ends of the legs of different segmented conductors, or a continuous wire that is bent to form an end loop at one of the ends of the stator core.

In the upper section 36 of the table of FIG. 3, the lines 21 extending between the slots indicate the general arrangement of the end loops 24 on the crown end 30, viewed from the crown end. Each line 21 extending between the slot sets is associated with a set of four end loops on the crown end of the stator. For example, the top line 21a extending between the slot sets associated with poles two and three on the upper section 36 of the table represents four different end loops extending between layers 1 and 2 for the path A conductors. Accordingly, the line 21a represents the following four end loops:

a first end loop having a pitch of fifteen (15) extends between the conductor identified by numeral "1" in the left slot set (i.e., in the slot set associated with pole two) and the conductor identified by numeral "2" in the right slot set (i.e., in the slot set associated with pole three);

a second end loop having a pitch of eleven (11) extends between the conductor identified by the numeral "3" in the left slot set and the conductor identified by the numeral "4" in the right slot set;

a third end loop having a pitch of eleven (11) extends between the conductor identified by the numeral "5" in the left slot set and the conductor identified by the numeral "6" in the right slot set; and a fourth end loop having a pitch of eleven (11) extends between the conductor identified by the numeral "7" in the left slot set and the conductor identified by the numeral "8" in the right slot set.

It will be recognized that each set of four end loops on the crown end 30 (e.g., the end loops associated with line 21a, as noted above) define a set of over-under end loops extending between two poles. In particular, each set of four end loops includes a fifteen (15) pitch end loop that extends over three interleaved eleven (11) pitch end loops.

The lower section 38 of the table of FIG. 3 is similar to the upper section 36, with the lines extending between slot sets indicating the general arrangement of the twists and associated connections between the leg ends in order to form end loops on the weld end 32 of the stator core 12. Each short line 23 extending horizontally from a slot set in the lower section 38 of FIG. 3 represents four different leg ends, each having a twist of six. Each oval 25 in the lower section 38 of FIG. 3 represents one of the connections between two twisted leg ends. Therefore, each set of two lines 23 and three ovals 25 represent three end loops for one path of conductors on the connection end 32 of the stator core 12.

For example, between poles two and three, the three end loops 24a include the following:
- a first end loop extending between the conductor identified by the numeral "2" in layer 2 of the right slot set and the conductor identified by the numeral "3" in layer 1 of the left slot set;
- a second end loop extending between the conductor identified by the numeral "4" in layer 2 of the right slot set and the conductor identified by the numeral "5" in layer 1 of the left slot set; and
- a third end loop extending between the conductor identified by the numeral "6" in layer 2 of the right slot set and the conductor identified by the numeral "7" in layer 1 of the left slot set.

In addition to the above, the oval at end loop 24b indicates a special crossover connection between the conductor identified by the numeral "8" in layer 2 of the right slot set and the conductor identified by the numeral "9" in layer 3 of the left slot set.

As shown in FIG. 3, most of the end loops 24 on the connection end 32 of the stator core are regular end turns 24a, each of which connects two straight conductor segments within the same layer pair (e.g., the end loop 24 connecting the path A conductor identified by the numeral "2" in layer two to the path A conductor identified by the numeral "3" in layer 1 is a regular end turn with a pitch of twelve). However, in addition to regular end turns 24a that extend between conductors in the same layer pair, the end turns on the connection end 32 also include a group of crossover end turns 24b, each of which connects a conductor in one layer pair to a conductor in an adjacent layer pair (e.g., the end loop connecting the path A conductor identified by the numeral "8" in layer 2 of the right slot set and the conductor identified by the numeral "9" in layer 3 of the left slot set is a crossover end turn; accordingly, the term "crossover" end turn as used herein refers to an end turn that connects conductors in two different layer pairs of the winding). Two crossover end turns 24b are included for each path of each phase. With respect to path A, the crossover end turns include a first crossover end turn extending between poles two and three and connecting conductors in layer 2 to conductors in layer 3, and a second crossover end turn extending between poles five and six and connecting conductors in layer 6 to conductors in layer 7.

In addition to the crossover end turns 24b, the winding also includes one busbar 34 for each path of each phase. Similar to the crossover end turns 24b, each busbar 34 provides a connection between conductors in two adjacent layer pairs, and particularly a connection between conductors in layer 4 and conductors in layer 5 for a given path. However, the busbar 34 extends for a significantly greater number of slots than the crossover end turns 24b (which have a pitch of twelve). For example, in FIG. 3, the busbar connection for path A extends a total of twenty-four slots from the conductor identified as "16" in layer 4 to the conductor identified as "17" in layer 5, and thus, the busbar 34 extends twice the number of slots as the crossover end turn 24b.

The busbars 34 provide connections between conductors in layer 4 and layer 5 of the winding which are not conveniently made between two adjacent leg ends. Accordingly, the terminal portions of leg ends connected with a busbar 34 may extend axially past the other terminal portions (e.g., the terminal portion of the conductors identified as "16" and "17" in FIG. 3 may extend axially past the other nearby conductors such as those identified as "14" and "23"). The busbar 34 may be easily connected to these leg ends and routed in a circumferential manner above (i.e., at a position axially outward from) the other leg ends that form the end turns 24 at the connection end 32 of the core 12.

In order to form the winding of FIG. 3, segmented conductors are inserted axially into the slots 16 of the core 12 from the crown end 30. As a result, the pre-formed end turn 24 of each segmented conductor is situated on the crown end 30 with the legs of the segmented conductor extending through two different layers of two different slots of the core, and the leg ends extending axially outward at the connection end 32 of the core. The legs at the connection end of the core are then twisted and adjacent terminal ends 29 of the legs are connected together to form regular end turns 24a and crossover end turns 24b at the connection end of the core. Thereafter, busbars 34 are connected to the remaining leg ends that are configured to provide the busbar connections between the conductors extending from layer 4 and layer 5.

As noted previously, the winding includes six paths (i.e., paths A, B, C, D and E), and each path is similarly configured to that of path A, but shifted some number of slots on the core. As shown in FIG. 3, path A begins at the lead 40 on the connection end 32 extending from the conductor identified as "1." Conductor "1" extends through the core and on the opposite end (i.e., on the crown end 30), a fifteen pitch over end turn connects conductor "1" to conductor "2." Conductor "2" then extends through the core to the connection end 32, where the leg end of conductor "2" is twisted six slots to the left and is welded to the leg end of conductor "3," which leg end twists six slots to the right, such that a twelve pitch end turn is formed on the connection end between conductor "2" and conductor "3." Then, conductor "3" extends through the core, back to the crown end 30, where it connects to an eleven pitch end loop that connects conductor "3" to conductor "4." This pattern of a twelve pitch end loop on the connection end 32 and an eleven pitch end loop on the crown end 30 is then repeated until reaching conductor "8." It will be recognized that the pattern of conductors "1"-"8" forms a first coil on the stator core with straight conductor portions extending through the slots associated with poles two and three, with end turns 24 extending between the straight portions.

At conductor "8," the leg end twists six slots to the left on the connection end 32 and is welded to the leg end of conductor "9" which twists six slots to the right. This forms a twelve pitch crossover end loop on the connection end extending between layers 2 and 3 (and thus connecting a first layer pair to a second layer pair). The above-described pattern of conductor "1" through conductor "8" is repeated for each of conductors "9" through "16," except the conductors are arranged in layers 3 and 4. Thus, conductors "1"-"8" form a first coil on the stator core, and conductors "9"-"16" form a second coil on the stator core. It will be recognized that both the first coil and the second coil are associated with the same pair of poles (i.e., poles two and three). It will also be recognized that both the first coil and second coil have a plurality of straight portions 27 located in one pole (i.e., pole two) and a plurality of straight portions located in another pole (i.e., pole three).

At conductor "16," a busbar 34 connects conductor "16" in layer 4 to conductor "17" in layer 5 (which conductor "17" is twenty-four slots removed from conductor "16," as described above). The pattern of conductors "1"-"16" is then repeated as conductors "17"-"32," except the conductors are now arranged in layers 5-8 instead of layers 1-4). At conductor "32," the paths completed at a lead 40. It will be recognized that the pattern of conductors "17"-"24" forms a third coil on the stator core, and the pattern of conductors "25"-"32" forms a fourth coil on the stator core. Both of the third coil and the fourth coil are associated with the same pair of poles (i.e., poles five and six). The coils define four different sections for each parallel path, including a first section defined by the first coil, a second section defined by the second coil, a third section defined by the third coil, and a fourth section defined by the fourth coil.

As described herein, the winding arrangement of FIG. 3 is configured as a three-phase, six (6) pole winding having six (6) parallel paths per phase. The winding is arranged on a stator core having seventy-two (72) slots. The winding includes eight (8) conductors per slot with eight layers of conductors in each slot. As such, the conductors are arranged in a single-file manner in each slot. The winding is defined by four (4) slots-per-pole-per-phase (i.e., 72 slots/(6 poles×3 phases)=72/18=4 slots-per-pole-per-phase). The winding is also defined by sixteen pole-turns (PT). The number of pole-turns for a given winding refers to the number of slot segments per parallel path (SS) divided by two (i.e., PT=SS/2), where SS is equal to the number of straight conductor segments extending through the core in each parallel path. Thus, in the example of the winding of FIG. 3, SS=32, as noted by conductors "1"-"32" for path A. Accordingly, the number of pole-turns (per parallel path) is sixteen for the winding of FIG. 3 (i.e., PT=SS/2=32/2=16).

In view of the above, it will be noted that the winding of FIG. 3 is configured such that the number of pole-turns is not evenly divisible by the number of poles. Specifically, the number of pole-turns is sixteen (16) and the number of poles is six (6), so 16/6=2⅔. Therefore, it will be noted that dividing the number of pole turns for each parallel path of the winding by the number of poles returns a mixed number (i.e., a number that is a non-integer such that it includes both a whole number and a proper fraction). This winding arrangement provides a unique configuration wherein the number of pole-turns for each parallel path of the winding is not a whole number, thus providing a winding with unique and specialized performance characteristics that are not common to other winding arrangements.

While embodiments of the winding arrangement are disclosed herein, it will be recognized that other embodiments are also possible. For example, while the winding arrangements disclosed herein have been described in association with segmented conductors with welded end loops at the connection end, in at least some embodiments, the winding arrangements may be formed with continuous wire segments (e.g., the entire path A for a given phase may be formed with one continuous wire). In this case the different twists may be formed in the end loops by an end loop forming machine. In other embodiments, any number of different winding features may be changed, such as the number of poles of the winding, the number of pole-turns of the winding may be different than sixteen, the number of parallel paths, and the number of slots-per-pole-per-phase.

First Alternative Embodiment of Winding

Figure 4:
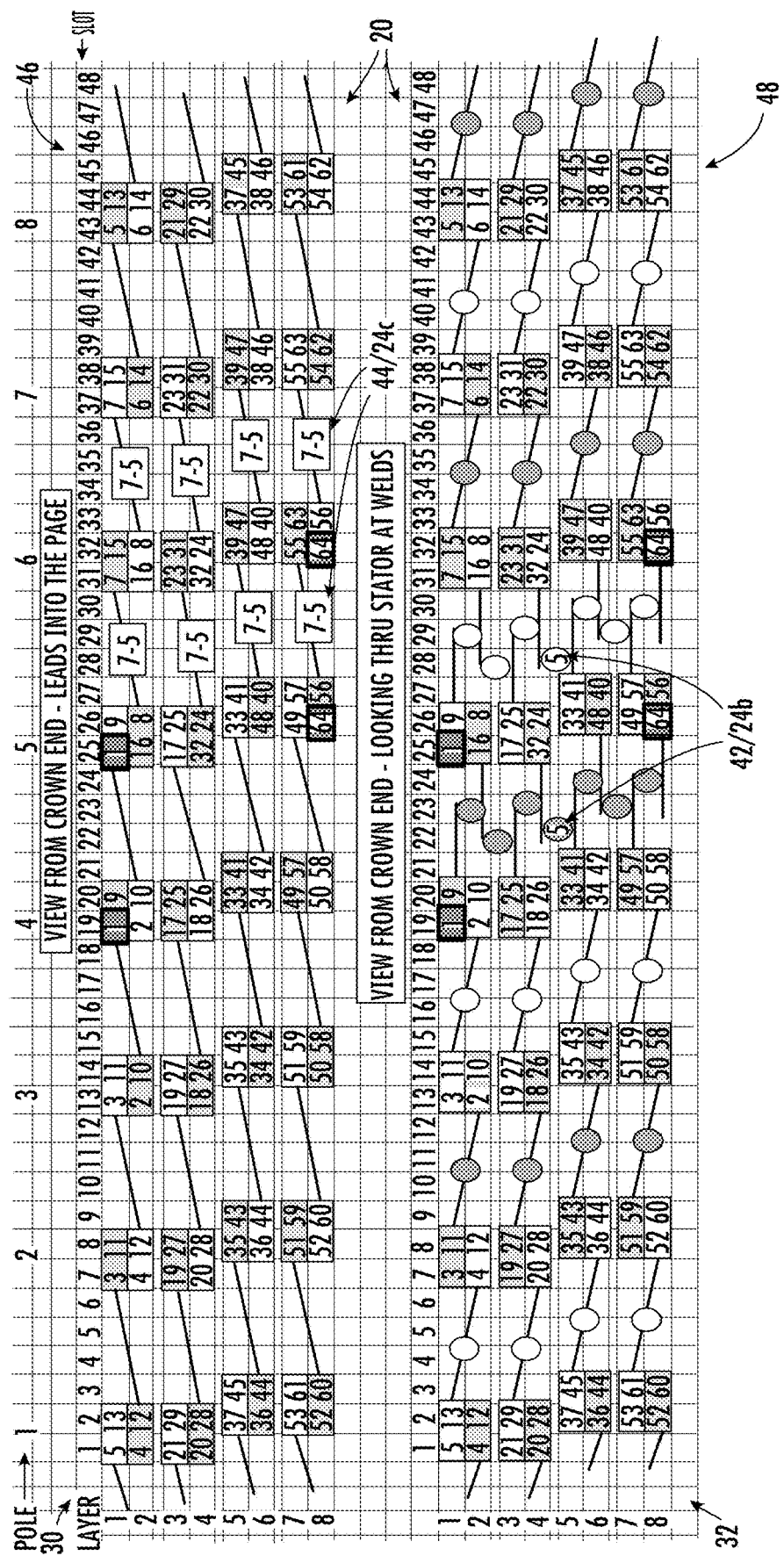
FIG. 4 is a tabular diagram of a first alternative embodiment of the segmented conductor winding of FIG. 3.

A first example of an alternative embodiment of the winding arrangement is disclosed in FIG. 4. The winding of FIG. 4, is somewhat similar to the winding described in FIG. 3, but with significant differences that provide a winding with different features from that of FIG. 3. Only one phase of the winding is illustrated in FIG. 4, and it will be recognized that, for a three phase winding, the two other phases are identical to that shown, but the first additional phase is shifted over two slots, and the second additional phase is shifted over four slots.

The top portion 46 of the table in FIG. 4 is a view of end loops extending between stator slots with the leads facing into the page. The straight portions of the segmented conductors are numbered 1-64 within the boxes of the table, with each box representing a straight portion of a segmented conductor in one layer of one slot. The lines between the boxes are end loops 24 connecting the straight portions of the conductors. The bottom portion 48 of the table in FIG. 4 is a view is from the end loop end, looking thru the stator at the weld end. Again, the ovals represent welds on the connection end of the stator core.

As noted in the top two rows of the table of FIG. 4, the winding arrangement 20 includes eight poles (as noted by the eight slot sets associated with each phase) and is configured for use in a stator core having forty-eight slots. As noted in the leftmost column of FIG. 4, the conductors of the winding (i.e., the straight portions 27 of the conductor legs) are arranged in single-file manner in eight layers (L) in each of the seventy-two slots. Each pole of the winding extends across three slots (per phase). For example, pole #1 is arranged in slots 1, 2 and 3, pole #2 is arranged in slots 7, 8 and 9, pole #3=slots 13, 14 and 15.

As shown in FIG. 4 each path of the winding includes two parallel paths (i.e., path A and path B). Each parallel path is similarly configured with the first parallel path (path A) shifted one pole from the second parallel path (path B). For path A, the path begins with the lead identified by numeral "1" at layer 1 of slot 19, jumps (via an end turn on the crown end 30) to the next slot identified by the numeral "2" in layer 2 of slot 13, jumps (via an end turn on the connection end 32) to the next slot identified by the numeral "3" in layer 1 of slot 7, and so on until the path ends at the slot identified by the numeral "64" at layer 8 of slot 26. Similarly, path B begins with the lead identified by numeral "1" at layer 1 of slot 25 and ends with the lead identified by numeral "64" at layer 8 of slot 32

As can be seen in FIG. 4, the winding has two slots per pole per phase. The winding has a standard end loop pitch of six. For example, the end loop that connects the slot segment identified by numeral "1" in slot 25 to the slot segment identified by numeral "2" in slot 19 is a six pitch end loop (i.e., 25−19=6). All end loops at the crown end 30 and the connection end 32 are six pitch end turns unless shown differently.

The winding of FIG. 4 includes one short pitch crossover end turn 42 per path in order to create phase shifting. This short pitch end turn is on the connection end 32 in the middle of the winding between layers 4 and 5 and between the conductor segments identified as numerals "32" and "33." The two short pitch end turns 42 are also identified in the bottom portion 48 of the table of FIG. 4 by the numeral "5" in the ovals positioned between the conductor segments identified as numerals "32" and "33."

In addition to the standard end loops and the short pitch end loops, the winding of FIG. 4 also includes a series of over-under end loops 24c on the crown end 30 of the stator, which end loops 44 are labeled "7-5" on the upper portion of the table of FIG. 4 in order to denote the seven-pitch of the over end loops and the five-pitch of the under end loops (and each pair of associated seven-pitch five-pitch end loops defining a "set" of over-under end loops). For these end loops 44, the over end loops bridge completely over the under end loops. For example, for path A, a five pitch end loop connects the slot segment identified as numeral "7" in layer 1 of slot 37 to the slot segment identified as numeral "8" in layer 2 of slot 32, and a seven pitch end loop connects the slot segment identified as numeral "15" in layer 1 of slot 38 to the slot segment identified as numeral "16" in layer 2 of slot 31. An over-under end loop configuration is used to achieve this long/short pitch arrangement (i.e., the seven pitch end loop bridges directly over the five pitch end loop).

In order to further describe the winding of FIG. 4, a detailed description of one of the two parallel paths (path B) is now provided. The path begins with a lead to the slot segment identified as numeral "1" at layer 1 of slot 25. An end loop connects slot segment 1 to slot segment "2" housed in layer 2 of slot 19 on the crown end 30 side of the stator. From slot segment "2," an end loop on the connection end 32 connects slot segment "2" to slot segment "3" located at layer 1 of slot 13. This pattern continues, alternating around the core until slot segment "7" in layer 1 of slot 37.

At slot segment "7," a five pitch (under) end loop connects slot segment "7" with slot segment "8" in layer 2 of slot 32. Continuing from slot segment "8," an end loop at the connection end 32 (which may also be referred to herein as a "weld loop") connects slot segment "8" with slot segment "9" housed in layer 1 of slot 26. This completes one wrap around the stator.

Following the first wrap around the stator, an end loop at the crown end 30 (which may also be referred to herein as simply an "end loop") connects slot segment "9" in layer 1 of slot 26 with slot segment "10" in layer 2 slot 20. A weld loop connects slot segment "10" with slot segment "11" housed in layer 1 and slot 14. This pattern continues again until slot segment "15" is reached at layer 1 of slot 38. At slot segment "15," a seven pitch end loop connects slot segment "15" with slot segment "16" housed in layer 2 of slot 31. This completes a second wrap (or "turn") around the stator core for the path. A crossover end loop 24b connects slot segment "16" with slot segment "17" housed in layer 3 of slot 25. This completes path A for the layer pair associated with layers 1 and 2, and the crossover end loop 24b transitions the path into the next layer pair associated with layers 3 and 4.

From slot segment "17," an end loop connects slot segment "17" to slot segment "18" housed in layer 4 of slot 19. The path continues along in layer 3 and 4 (similar to the way it wrapped twice in layers 1 and 2) to complete a third wrap and a fourth wrap that ends at slot segment "32" in layer 4 of slot 31.

At slot segment "32," a short five pitch crossover weld loop connects slot segment "32" with slot segment 33 in layer 5 of slot 26. The short pitch 5 creates the phase shifting or 4-8-4 slot pattern. While a short five-pitch weld loop is used to create the phase shifting, in at least one alternative embodiment a seven-pitch end loop is utilized instead of the five-pitch end loop to create the phase shifting or 4-8-4 slot pattern.

Similar to the four previously described wraps, a fifth wrap and a sixth wrap are completed in layers 5 and 6. The sixth wrap ends at slot segment "48" in layer 6 of slot 32. A crossover weld loop is then used to connect slot segment "48" of layer 6 to slot segment "49" in layer 7 of slot 26. After this a seventh and eight wrap are similarly completed in layers 7 and 8. The winding then finishes at slot segment "64" in layer 8 of slot 32.

As can be seen in FIG. 4, the crossover end loops that transition the winding path between layer pairs (i.e., the end loops providing connections (i) between layers one/two and three/four, (ii) between layers three/four and five/six, and (iii) between layers five/six and seven/eight) are conveniently aligned between the poles. For example, for path A of FIG. 4, the crossover end loops are all positioned between poles 4 and 5 on the connection end of the stator core. Stated differently, the welds that connect the leg ends forming the crossover end loops are all aligned in a radial direction between two poles of the path. While the actual welds that connect the leg ends forming the crossover end turns may not be perfectly aligned in the radial direction, they are all substantially aligned in the radial direction such that all of the welds forming the crossover end turns for a given path are arranged between two poles (e.g., the welds may be offset by some amount such as 10°-30° relative to radial, but are nevertheless arranged in radial succession at a location on the winding between two poles for the path). This arrangement of the aligned crossover end turns on the weld end 32 is facilitated, at least in part, by the over-under end turns 24c on the crown end 30.

Second Alternative Embodiment of Winding

Figure 5:
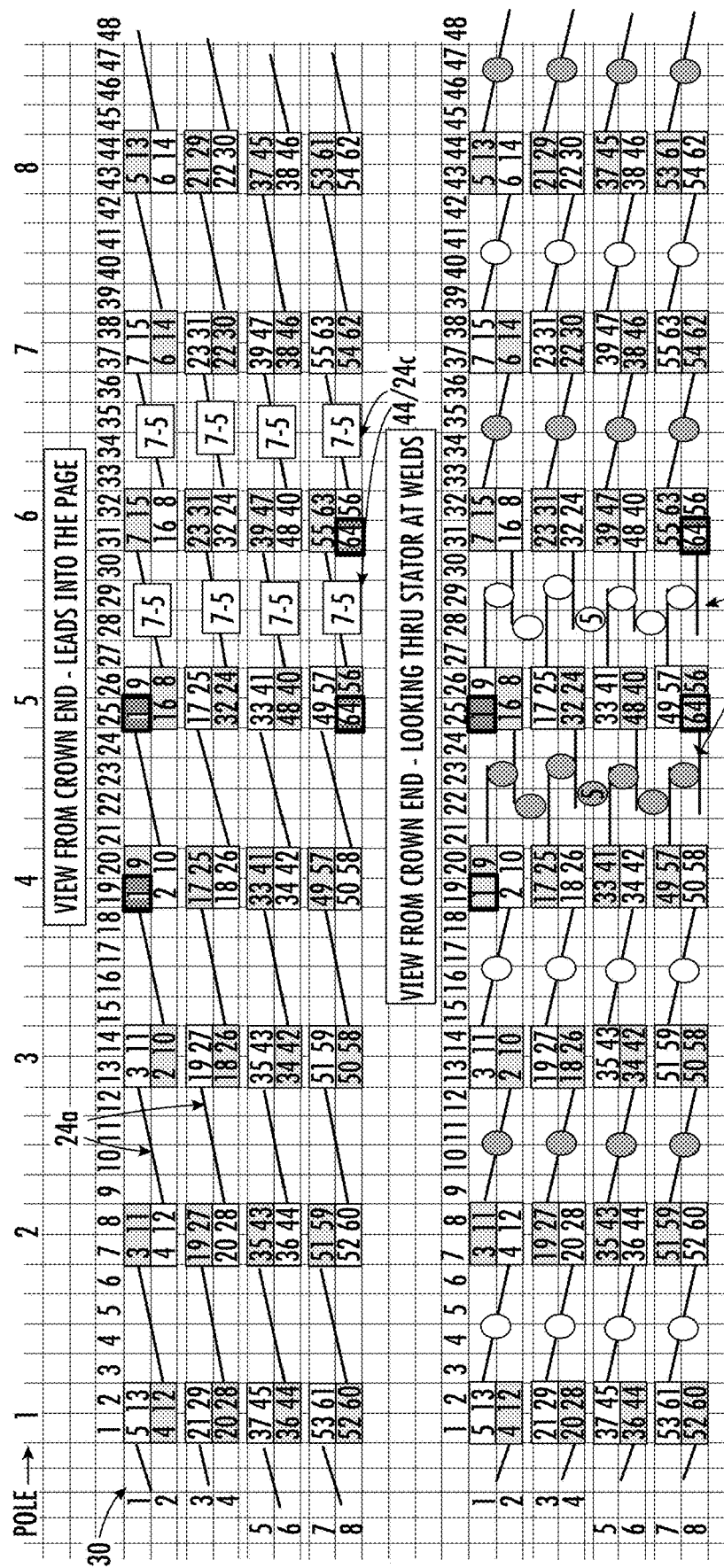
FIG. 5 is a tabular diagram of a second alternative embodiment of the segmented conductor winding of FIG. 3.
Figures 6, 7:
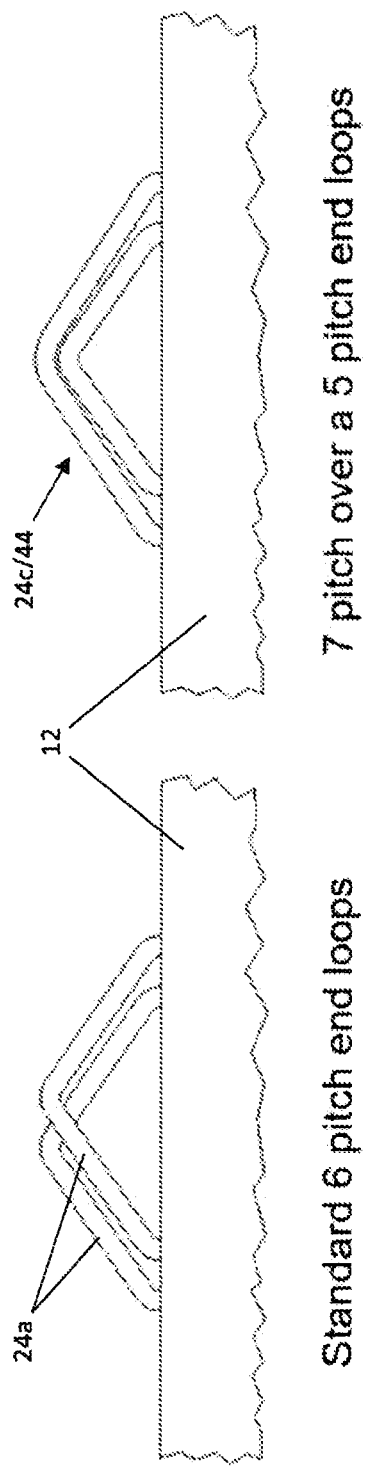
FIG. 6 is a side view of standard end turns (6-pitch) and over-under end turns (7-pitch over 5-pitch) configured for use in the winding of FIG. 5.
FIG. 7 is a diagram showing the weld pattern between poles 4 and 5 of the winding of FIG. 5.

A second example of an alternative embodiment of the winding arrangement is disclosed in association with FIGS. 5-7. The winding arrangement of FIG. 5 is substantially the same as that of FIG. 4, but the arrangement of FIG. 5 does not include the short five pitch weld loops that provide the phase-shifting arrangement of FIG. 4. This is particularly advantageous when an 8-8 slot pattern is desired instead of the 4-8-4 (phase-shifted) slot pattern of FIG. 4. In this case, a standard six-pitch replaces the previously described five-pitch short pitch of FIG. 4. A tabular diagram of a winding with an 8-8 slot pattern is shown in FIG. 5. Again, the winding arrangement of FIG. 5 is substantially the same as FIG. 4, except a standard six-pitch weld end loop is used for all crossover end turns in FIG. 5, as opposed to the two short five-pitch crossover end turns of FIG. 4. This results in the 8-8 slot pattern shown in the tabular diagram of FIG. 4. All other connections, including the over-under seven/five pitch end turns on the crown end 30, as well as the standard pitch end turns and the lead positions, remain the same.

FIG. 6 is a radial/side view illustrating the configuration of the end turns on the crown end of the winding arrangement of FIG. 5. As shown on the left side of FIG. 6, two standard six-pitch end turns 24 are shown in a relationship wherein one standard end turn is interleaved with a neighboring standard end turn. In contrast, the right side of FIG. 6 shows a pair of over-under end loops 24c wherein the seven-pitch over end loop extends completely over and bridges the five-pitch end turn.

FIG. 7 shows a weld pattern diagram for the winding of FIG. 5. This view is from the crown end 30 of the stator, looking completely through the stator and to the connections at the connection end 32. The rectangles in FIG. 7 represent the legs of various conductors and the ovals represent the welds that connect the tips of the legs. The numbers in the rectangles are the slot segments associated with particular conductors in the tabular diagram of FIG. 5. For example, slot segment "1" of layer 1 of slot 19 is a lead on the connection end 32 of the stator. Slot segment "9" in layer 1 of slot 20 exits the slot at the connection end 32 of the stator and twists three slots to right, while slot segment "8" in layer 2 of slot 26 exits the slot and twists three slots to the left. After twisting slot segment "9" of layer 1 is aligned with slot segment "8" of layer 2 at a position on the connection end 32 between poles 4 and 5. As shown in FIG. 7, the legs of slot segments "8" and "9" are welded together as represented by the oval between the two slot segments. Similarly, slot segment "17" in layer 3 of slot 19 exits the slot and twists three slots to the right, while slot segment "16" in layer 2 of slot 25 exits the slot and twists three slots to the left. The legs of slot segments "16" and "17" are welded together as represented by the oval between the two slot segments in FIG. 7. A similar twisting and weld connection is also provided as shown in FIG. 7 for each of slot segments "24" and "25," "32" and "33," etc. With this pattern, slot segments in layers 1, 3, 5, and 7 twist three slots to right and slot segments in layers 2, 4, 6, and 8 twist 3 slots to the left.

It will be recognized that the numbered slot segments in FIG. 7 are associated with path A and illustrate a number of crossover end turns 24b that provide connections between layer pairs (i.e., the weld between "16" and "17" connects layer pair 1-2 to layer pair 3-4, the weld between "32" and "33" connects layer pair 3-4 to layer pair 5-6, and the weld between "48 and 49" connects layer pair 5-6 to layer pair 7-8). These welds for the crossover end turns are all aligned in a radial direction while also being staggered relative to the neighboring welds that provide regular end turn connections 24a within a layer pair (e.g., the crossover end turn connection 24b between "16" and "17" is staggered in the circumferential direction relative the regular end turn connection 24a between "8" and "9" as well as "24" and "25"). In the arrangement of FIGS. 5 and 7, all welds for the crossover end turns of path A are arranged between poles 4 and 5, while all welds for the crossover end turns for path B are arranged between poles 5 and 6. Accordingly, the neighboring welds between these poles are all staggered in the circumferential direction (i.e., not circumferentially aligned).

While the welds for end turns with neighboring cross-over end turns are staggered in the circumferential direction, it will be appreciated that welds for regular end turns 24a that are not associated with a neighboring cross-over end turn 24b are all aligned in the circumferential direction. For example, in FIGS. 5 and 7 it can be seen that all end turns between poles 3 and 4 are aligned, as well as all end turns between poles 7 and 8. This arrangement with aligned regular end turns 24a between most poles and a few staggered end turns for cross-over connections 24b between a few poles is advantageous, as it facilitates fast and convenient welding of the leg ends at the connection end of the stator during assembly. Thus, the disclosed winding arrangement not only provides for advantageous features within the stator, but is also relatively easy to manufacture.

Third Alternative Embodiment of Winding

Figure 8:
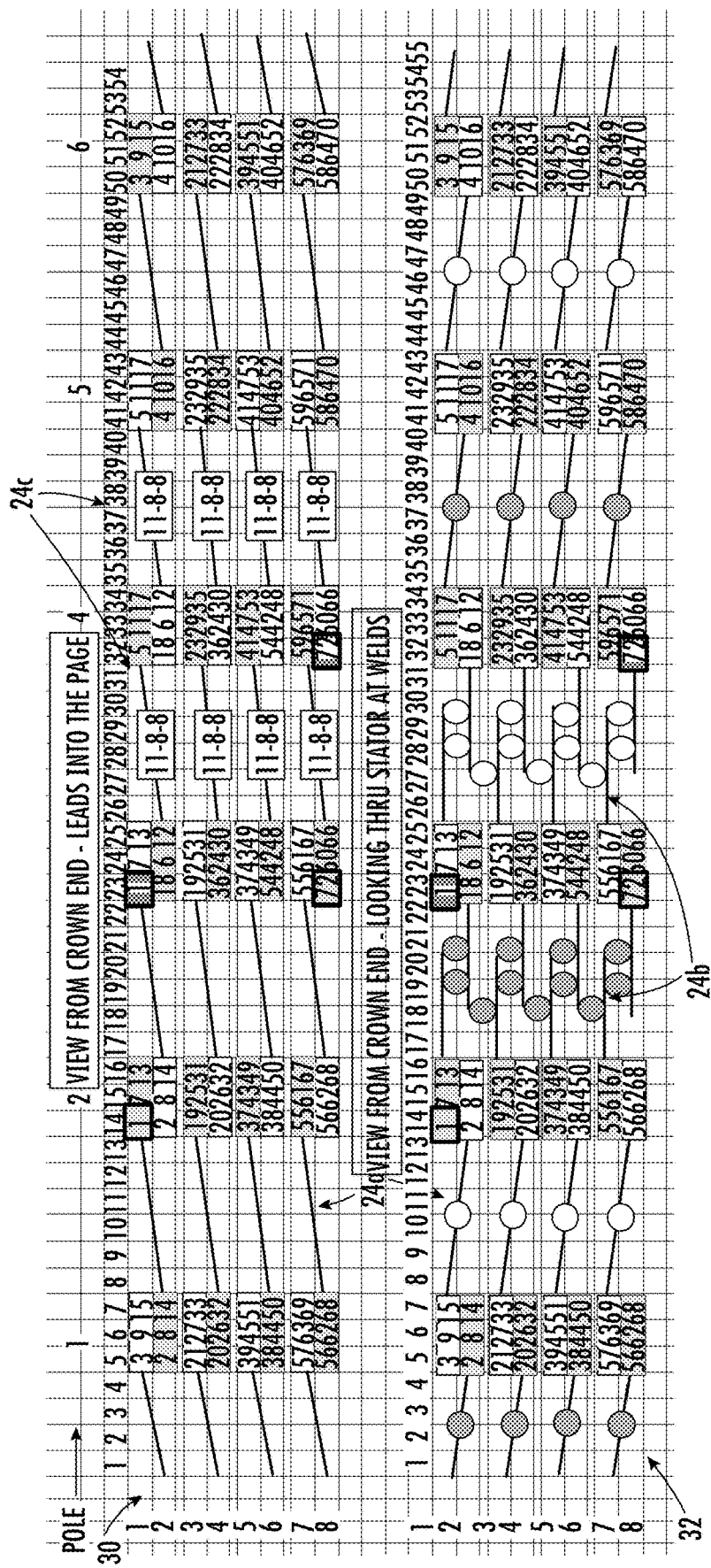
FIG. 8 is a tabular diagram of a third alternative embodiment of the segmented conductor winding of FIG. 3.
Figure 9:
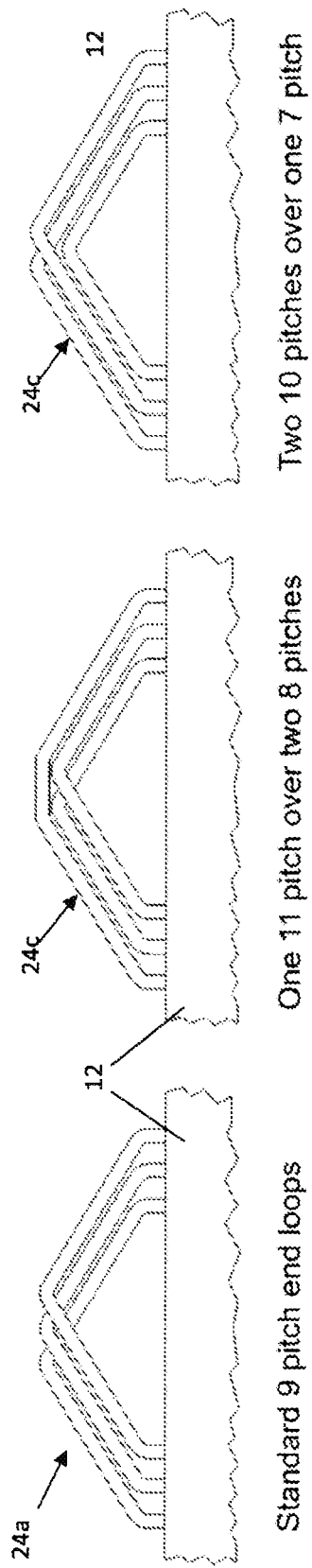
FIG. 9 is a side view of standard end turns (9-pitch), a first over-under end turn configuration (11-pitch over two 8-pitch), and a second over-under end turn configuration (two 10-pitch over one 7-pitch) for use in the winding of FIG. 8.

A third example of an alternative embodiment of the winding arrangement is disclosed in association with FIGS. 8-9. FIG. 8 shows a tabular diagram of this third alternative embodiment of the winding. The winding of FIG. 8 is similar to that of FIGS. 4 and 5, but with some significant differences. As shown in FIG. 8, the winding is configured as a three slots-per-pole-per-phase (SPPPP) winding, as opposed to two SPPPP as in FIGS. 4 and 5. The winding of FIG. 8 also has only six poles.

For the winding arrangement of FIG. 8, the standard end turns 24a have a pitch of nine (standard pitch=9), and the over-under end turns 24c have a pitch of eleven (over), eight (under #1) and eight (under #2), respectively (i.e., there are two eight-pitch under end turns and one eleven-pitch over end turn, wherein the eleven-pitch over end turn bridges across the two eight-pitch under end turns). An example showing the one over/two under end turn arrangement is shown in between poles 3 and 4 of FIG. 8 at layers 1 and 2. At this location, an eleven-pitch end turn connects slot segment "17" in layer 1 of slot 34 to slot segment "18" in layer 2 of slot 23; an eight-pitch end turn connects slot segment "11" in layer 1 of slot 33 to slot segment "12" in layer 2 of slot 25; and an eight-pitch end turn connects slot segment "5" in layer 1 of slot 32 to slot segment "6" in layer 2 of slot 24.

FIG. 9 is a radial/side view illustrating the configuration of the end turns on the crown end of the winding arrangement of FIG. 8. As shown on the left side of FIG. 9, three standard nine-pitch end turns 24a are shown in a relationship wherein each standard end turn is interleaved with the neighboring standard end turns.

The middle view of FIG. 9 shows a set of three over-under end loops 24c wherein the eleven-pitch over end loop extends completely over two eight-pitch end loops that are interleaved with each other in neighboring slots and layers. As shown in the middle of FIG. 9, the eleven-pitch end loop bridges both of the eight-pitch end loops.

The right side of FIG. 9 shows an alternative arrangement for the over/under end loops 24c of the winding of FIG. 8. In this arrangement, there are two ten-pitch over end loops and one seven-pitch under end loop. The two ten-pitch over end loops are interleaved and bridge over the one seven-pitch end loop.

ADDITIONAL EMBODIMENTS

While various embodiments of the stator winding with over-under end turns for crossover alignment have been disclosed herein, it will be recognized that numerous additional embodiments are also possible. Examples of additional alternative embodiments include the following:

Fewer conductors housed in each slot (such as 2) or more conductors housed in each slot (such as 10);

The welds could be continuous end loops on both ends (not one axial end being weld end loops as can be found in a hairpin stator);

There may be more slots-per-pole-per-phase (SPPPP), such as 4;

For 4 SPPPP, the standard pitch=12 and the over-under pitches=one 15 over three 11 pitches;

For 4 SPPPP, the over under end loop pitches alternatively could be three 13 pitches over one 9 pitch;

For the 2 SPPPP, the design shown has one 7 over 5 end loop area for each wrap of two conductors around 360 degrees. As an embodiment, the number of 7 over 5 end loops has to be an odd number per wrap per 2 wires. So either one, three, five . . . etc. per wrap;

For 3 SPPPP, for each wrap of three conductors, there needs to be one or a factor of three plus 1 over-end loop areas per wrap. So for an example 1, 4, 7 . . . etc.; and For 4 SPPPP, for each wrap of four conductors there should be one or a factor of four plus 1 over end loop areas, such as 1, 5, 9 . . . etc.

Although exemplary embodiments of the invention have been disclosed herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. A stator for an electric machine comprising:
   a stator core including a plurality of teeth defining a number of slots in the stator core; and
   a multi-phase winding positioned on the stator core, the winding comprising a plurality of segmented conductors connected together to provide a plurality of parallel paths per phase for the winding, each conductor comprising (i) an end loop provided on a crown end of the stator core, (ii) two legs extending through the slots of the stator core, and (iii) two leg ends extending out of the slots on a connection end of the stator core, each leg end having a twist portion, wherein the leg ends of different conductors are connected together to form the multi-phase winding that wraps around the stator core;
   wherein the winding defines a number of conductor layers in each slot, a number of poles, a plurality of parallel paths per phase, and a number of slots-per-pole-per-phase;
   wherein the end loops on the crown end include a plurality of standard-pitch end loops and a plurality of sets of over-under end loops; and
   wherein a plurality of crossover end loops for at least one of the plurality of parallel paths per phase are substantially aligned in a radial direction on the connection end.

2. The stator of claim 1 wherein the standard-pitch end loops have a pitch of n, wherein each set of over-under end loops include one over end loop having a pitch of n+1 and one under end loop having a pitch of n−1.

3. The stator of claim 2 wherein the crossover end loops have a pitch of either n, n+1, or n−1.

4. The stator of claim 3 wherein n=6.

5. The stator of claim 1 wherein the number of conductor layers is eight.

6. The stator of claim 1 wherein the plurality of parallel paths per phase is defined by two parallel paths per phase.

7. The stator of claim 1 wherein the number of slots-per-pole-per-phase is two.

8. The stator of claim 1 wherein the number of slots-per-pole-per-phase is three.

9. The stator of claim 8 wherein the standard-pitch end loops have a pitch of n, and wherein each set of over-under end loops includes one over end loop having a pitch of n+2 and two under end loops having a pitch of n−1, wherein the two under end loops are interleaved, and wherein the one over end loop bridges over the two under end loops.

10. The stator of claim 8 wherein the standard-pitch end loops have a pitch of n, and wherein each set of over-under end loops includes two over end loops having a pitch of n+1 and one under end loops having a pitch of n−2, wherein the two over end loops are interleaved and bridge over the under end loop.

11. An electric machine comprising:
    a cylindrical stator core including a plurality of radially extending teeth defining a number of slots in the stator core; and
    a winding positioned on the stator core, the winding comprising a plurality of conductors connected together to provide a plurality of parallel paths per phase for the winding, wherein the winding defines a number of conductor layers in each slot, a number of poles, and a number of slots-per-pole-per-phase;
    wherein the winding includes a plurality of standard-pitch end loops and a plurality of sets of over-under end loops; and
    wherein a plurality of crossover end loops for each of the plurality of parallel paths per phase are substantially aligned in a radial direction on the stator core.

12. The electric machine of claim 11 wherein the standard-pitch end loops have a pitch of n, wherein each set of over-under end loops include one over end loop having a pitch of n+1 and one under end loop having a pitch of n−1.

13. The electric machine of claim 12 wherein the crossover end loops have a pitch of either n, n+1, or n−1.

14. The electric machine of claim 13 wherein n=6.

15. The electric machine of claim 11 wherein the number of conductor layers is eight.

16. The electric machine of claim 11 wherein the plurality of parallel paths per phase is defined by two parallel paths per phase.

17. The electric machine of claim 11 wherein the number of slots-per-pole-per-phase is two.

18. The electric machine of claim 11 wherein the number of slots-per-pole-per-phase is three.

19. The electric machine of claim 18 wherein the standard-pitch end loops have a pitch of n, and wherein each set of over-under end loops includes one over end loop having a pitch of n+2 and two under end loops having a pitch of n−1, wherein the two under end loops are interleaved, and wherein the one over end loop bridges over the two under end loops.

20. The electric machine of claim 18 wherein the standard-pitch end loops have a pitch of n, and wherein each set of over-under end loops includes two over end loops having a pitch of n+1 and one under end loops having a pitch of n−2, wherein the two over end loops are interleaved and bridge over the under end loop.

* * * * *